Sept. 17, 1963 W. R. TOWLER 3,104,392

EXCLUSIVE RADIO COMMUNICATION BETWEEN STATIONS AT SELECTED LOCATIONS

Filed April 18, 1961 3 Sheets-Sheet 1

INVENTOR
WILLIAM R. TOWLER
BY
ATTORNEY

Sept. 17, 1963 W. R. TOWLER 3,104,392

EXCLUSIVE RADIO COMMUNICATION BETWEEN STATIONS AT SELECTED LOCATIONS

Filed April 18, 1961 3 Sheets-Sheet 2

INVENTOR.
WILLIAM R. TOWLER
BY
Harry Hugg
ATTORNEY

INVENTOR.
WILLIAM R. TOWLER
BY
[signature]
ATTORNEY 3,104,392

EXCLUSIVE RADIO COMMUNICATION BETWEEN STATIONS AT SELECTED LOCATIONS

William R. Towler, Charlottesville, Va., assignor to Sperry Rand Corporation, Great Neck, N.Y., a corporation of Delaware Filed Apr. 18, 1961, Ser. No. 103,883
9 Claims. (Cl. 343—178)

This invention relates to a radio communication system, and more particularly to a short-range selective radio communication system wherein selective contact is established between two stations to the exclusion of other stations at different azimuth and/or range locations.

In recent years the use of radiotelephone communication has increased considerably and finds extensive use in ship-to-ship and ship-to-shore radio contacts, and is becoming increasingly popular in the pleasure boating field. At present, the use of radiotelephone communication is restricted to certain allocated bands in the frequency spectrum. With the increased use of radiotelephone communication, the allocated bands have become quite crowded and often it is impossible to employ the radiotelephone to its best advantage. It therefore is highly desirable to provide equipment for operation in the presently allocated bands which will permit establishment of the desired contacts without interference from, and without interfering with, other stations operating within the same frequency band, and even on the same carrier frequency.

It therefore is an objective of this invention to provide means for establishing radiotelephone communication within a band of frequencies without interfering with other stations at different locations operating within the same band.

A further object of this invention is to provide means for establishing a selective point-to-point contact between two remotely located communication stations.

Another object of this invention is to provide radiotelelpohe apparatus which permits a plurality of conversations between respective pairs of differently located stations operating on the same carrier frequency without mutual interference between the plurality of pairs of stations.

Another object of this invention is to provide means for establishing exclusive contact between two radio stations at given azimuth and range positions with respect to each other.

A further object of this invention is to provide a selective communication system for establishing point-to-point contact between two stations without interference from other stations at different locations operating on the same carrier frequency.

A further object of this invention is to provide a selective radio communication system capable of sending and receiving on a single antenna, and which permits two-way conversation without "press-to-talk" switching now common with radiotelephone systems.

These and other objects and advantages of the present invention, which will become more apparent from the specification and claims below, are achieved by providing at each station transmitting and receiving apparatus which sends out in a narrow directive radiation pattern pulses which are position, or time, modulated in accordance with modulation signals introduced at the station. A station receiving the pulses operates to produce a disabling signal which disables the receiving apparatus until the next input pulse is expected to be received from the desired sending station. The disabling signal is comprised of a combination of a first delaying pulse and a second delaying pulse whose time duration is controlled in accordance with a feedback biasing signal which is derived from an integrator whose output is a function of the duration of the time interval between the conclusion of a short enabling period occurring after the conclusion of the second delaying pulse and the commencement of the next received input pulse. The duration of the second delaying pulse automatically is adjusted by the feedback signal until the short enabling period begins immediately prior to, and concludes immediately upon the occurrence of, the next received input pulse from the desired sending station. That is, the time interval between the conclusion of the second delaying gate and the receipt of the next input pulse becomes very narrow in relation to the time between pulses. In this manner, the disabling signal which concludes at the beginning of the short enabling period, maintains the receiver apparatus disabled except for the short enabling period during which the next received pulse is expected to arrive.

The receiving apparatus includes a demodulator for the pulse-position-modulated signal and comprises means for generating a ramp-type voltage waveform during each period that the receiving apparatus is enabled to pass an input pulse. Each ramp-type waveform is simultaneously coupled to a staircase detector along with the next received time-modulated input pulse. The output of the detector is a signal whose magnitude varies as a function of the amplitude of the ramp-type voltage at the time of occurrence of the next succeeding input pulse.

At the conclusion of each one of the first delaying periods, the apparatus automatically transmits a pulse which is time modulated in accordance with the modulating signal introduced at that station. The other station then receives the transmitted pulse and responds in the same manner as previously described to lock on to the frequency of the received pulses, and thus lock on in range, thereby establishing a closed-loop selective radio communication system.

The invention will be described by referring to the accompanying drawings wherein.

Figure 1:
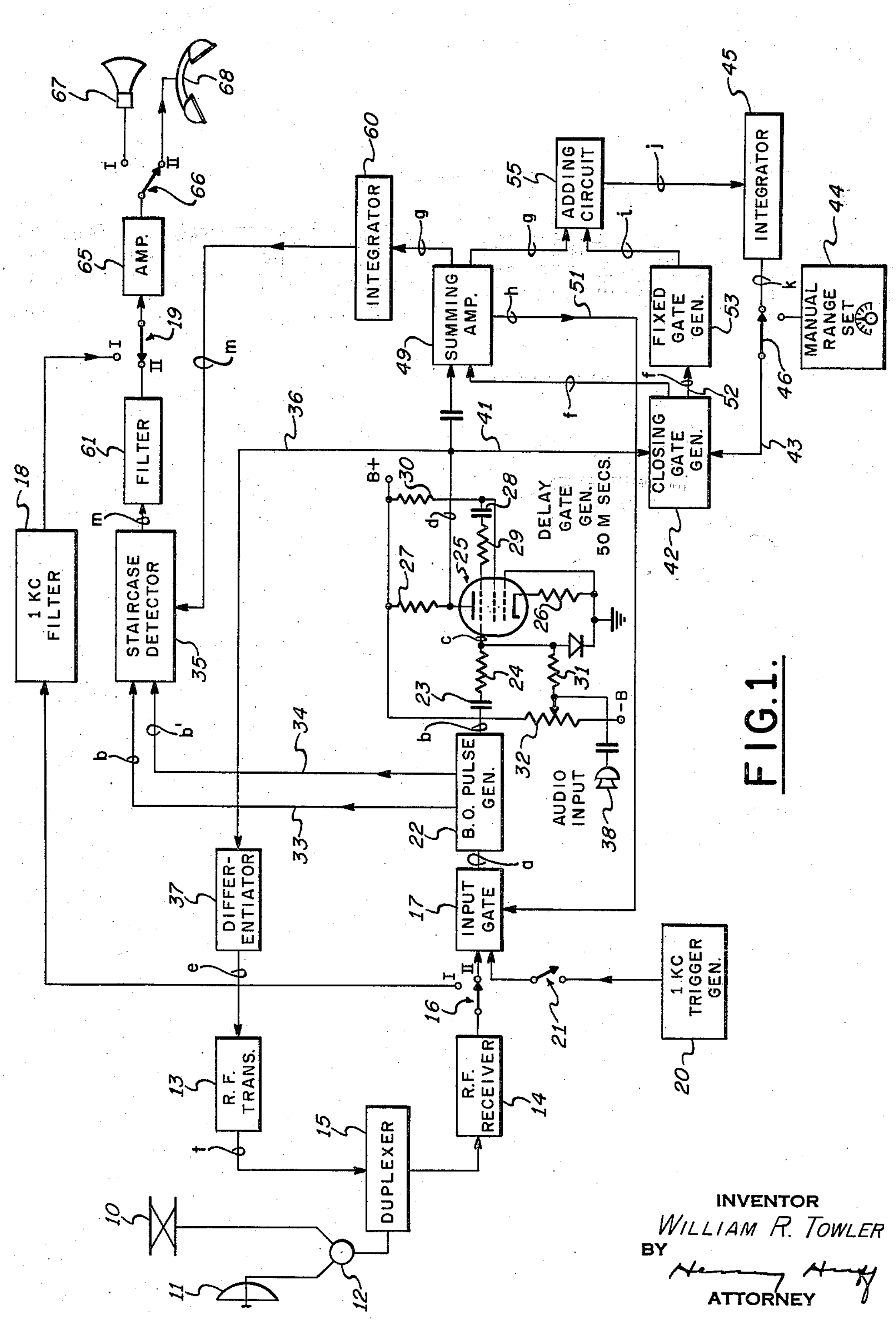
FIG. 1 is a diagrammatic illustration, partially in block form and partially in schematic form, representing the apparatus of the present invention.

Referring now to FIG. 1, there is shown a circuit diagram, partially in block form and partially in schematic form, of the receiver-transmitter combination of the present invention. Identical units of this type are located at the calling and responding stations. In order to simplify the drawings, FIG. 1 will be referred to in describing the operation of both the calling and responding stations. Each station includes an omnidirectional antenna 10 and a directional antenna 11, both coupled by means of coaxial transmission lines to a coaxial line switch 12. R.F. transmitter 13 and R.F. receiver 14 are coupled through a conventional duplexer 15 to said switch 12. Switch 12 may be operated to selectively connect either the omnidirectional antenna 10 or directional antenna 11 to duplexer 15. The output of receiver 14 is connected to a single-pole double-throw switch 16. Contact II of switch 16 is coupled to input gate 17 which functions, when enabled, to pass video pulses, FIG. 2*a*, from the output of the R.F. receiver 14 to the blocking oscillator pulse generator 22. Contact I of switch 16 is coupled through 1 kc. filter 18 to contact I of switch 19. A trigger generator 20 which produces narrow pulses at a repetition frequency of one kilocycle per second may be coupled through switch 21 to an input terminal of input gate 17.

Output pulses of waveform 2*a* are coupled to blocking oscillator pulse generator 22 which operates to produce several output signals corresponding to the input pulses applied thereto. Output waveforms 2*b* and 2*b'* are coupled over leads 33 and 34 from blocking oscillator 22 to a staircase detector 35. Another output, also represented by waveform 2*b*, is taken from pulse generator 22 and is coupled through coupling capacitor 23 and resistor 24 to the suppressor grid of pentode tube 25 which serves as a delay gate generator that produces a pulsed output of a given duration. The cathode of pentode 25 is coupled through resistor 26 to ground and the plate is coupled through resistor 27 to a source of potential B+. The screen grid is coupled to said source B+ through dropping resistor 30, and is coupled to the suppressor grid through capacitor 28 and resistor 29. The control grid of pentode 25 is coupled directly to ground. Pentode 25 thus is connected as a relaxation oscillator of the Van der Pol type similar to the one illustrated in FIGS. 18–22 of Electron Tube Circuits, by Seely, published by McGraw-Hill Book Co., Inc., 1950. In this oscillator, the screen and suppressor grid potentials are in phase with each other. The suppressor voltage waveform of delay gate generator 25 is shown by waveform 2*c*, and the plate waveform is shown by waveform 2*d*. The positive pulses of waveform 2*d* normally have a duration of approximately 50 microseconds. The audio signal from microphone 38 coupled to the suppressor grid through resistor 31 also affects the recovery time of delay gate generator 25 and will cause the transmitted pulses from the set to be time modulated in accordance with the audio signal, as will be explained further hereinbelow. The 50 microsecond pulses of FIG. 2*d* are coupled over lead 36 to differentiator 37 which produces the spikes of waveform 2*e* corresponding to the leading and trailing edges of the 50 microsecond pulses. The negative spikes corresponding to the trailing edges are coupled to R.F. transmitter 13 to trigger said transmitter. Thus in the absence of audio modulation, transmitter 13 automatically is triggered 50 microseconds after the passage of each input pulse through input gate 17. In the presence of audio modulation, the durations of the 50 microsecond pulses of waveform 2*d* are varied in accordance with the audio signal around this 50 microsecond nominal value. This in turn causes the transmitted pulses to be time modulated in accordance with the audio signal.

A second output from delay gate generator 25 is taken over lead 41 to the suppressor grid of closing gate generator 42, a relaxation oscillator substantially identical to delay gate generator 25. Closing gate generator 42 responds to waveform 2*d* and produces waveform 2*f* on its plate. The positive pulses of waveform 2*f* are initiated by the trailing edges of the positive pulses of waveform 2*d* from delay gate generator 25. The recovery time of closing gate generator 42, and thus the duration of the positive pulses produced thereby, is governed in part by the potential applied over lead 43 to its suppressor grid. The potential on lead 43 is applied either from manual range set 44, a source of variable D.C. voltage, or from the integrator 45, as will be explained more fully below.

Waveform 2*d* from delay gate generator 25 and waveform 2*f* from closing gate generator 42 both are coupled to summing amplifier 49 which combines said waveforms to produce output waveforms 2*g* and 2*h*. Waveform 2*h* is coupled back on lead 51 to input gate 17 and disables said gate for the duration of the positive portions of waveform 2*h*. It may be seen from waveform 2*h* that input gate 17 is disabled immediately after the passage therethrough of an input pulse from the other station and remains disabled until some time just before the recepit of the next incoming pulse from the other station of the pair. Waveform 2*h* desirably prohibits input gate 17 from passing any pulses that occur before or after the desired pulses. When this operation is achieved, for example at time $t_4$ of FIG. 2, the receiving station is locked on the pulse repetition frequency of the sending station, and because it is a closed loop system, is locked on in range to the sending station.

Output waveform 2*f* of closing gate generator 42 is coupled to fixed gate generator 53 which operates at the conclusion of the negative pulses of waveform 2*f* to produce the negative pulses of waveform 2*i*. Fixed gate generator 53 is a relaxation oscillator of the type previously described, except that it has a fixed bias on its suppressor grid to produce an output waveform whose negative pulses are fixed in duration at approximately 10 microseconds.

Waveforms 2*g* and 2*i* from summing amplifier 49 and fixed gate generators 53 are coupled to adding circuit 55 which additively combines said waveforms and produces output waveform 2*j*. Adding circuit 55 is coupled to integrator 45 which produces waveform 2*k*, a smoothed signal whose negative value is a function of the duration of the negative portions of waveform 2*j* from adding circuit 55. The smoothed waveform 2*k* may be connected through switch 46 to the suppressor grid of closing gate generator 42 to serve as a biasing voltage which controls the duration of the positive pulses of waveform 2*f*, the output of said closing gate 42. The more negative the waveform 2*k* fed back to closing gate generator 42, the longer the positive pulses of waveform 2*f*.

In the manual mode of operation, a variable D.C. bias voltage is connected from manual range set 44 through switch 46 to closing gate generator 42 to control the duration of the positive pulses of waveform 2*f*.

Figure 2:
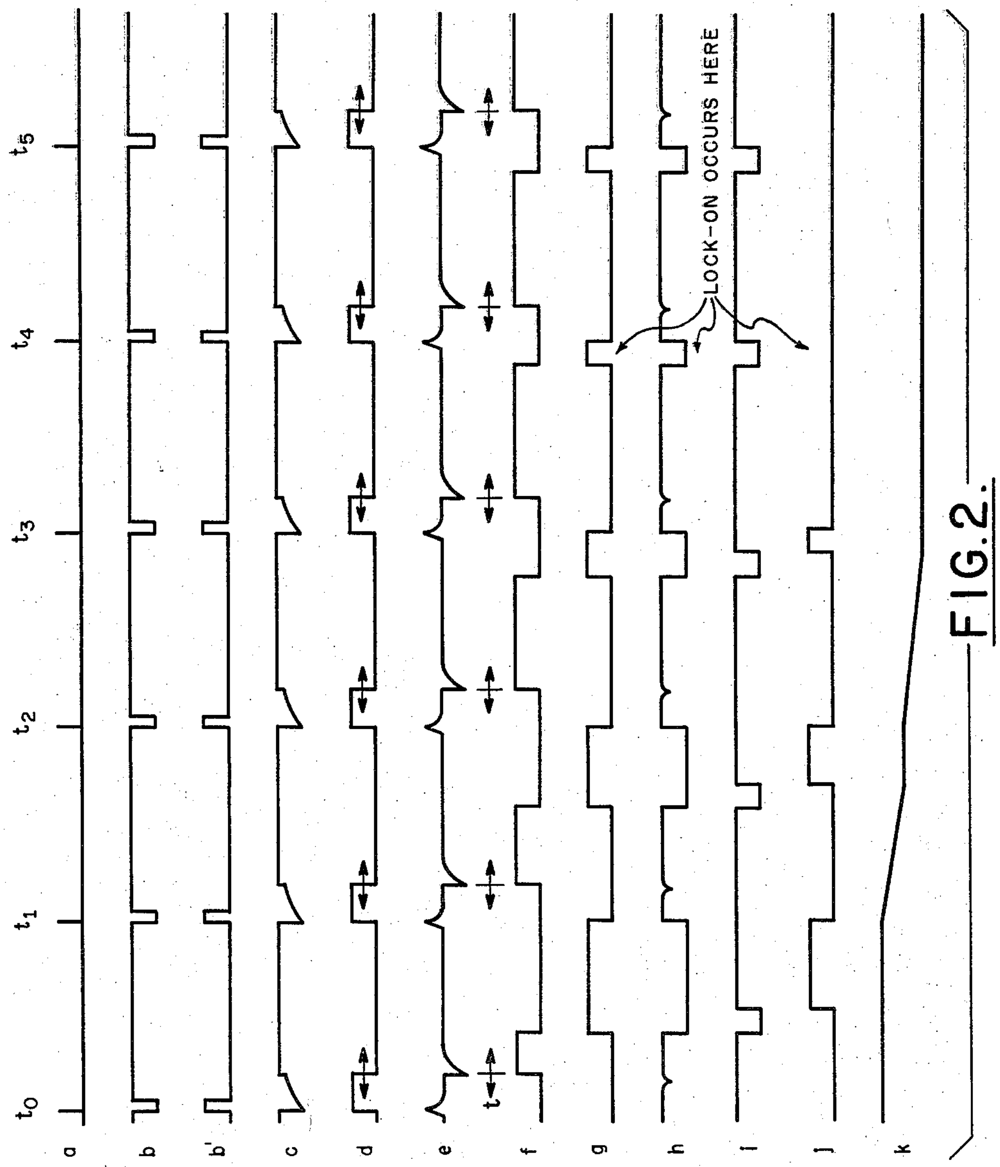
FIGS. 2 and 3 are waveforms used to help explain the operation of the appartius illustrated in FIG. 1.
Figure 3:
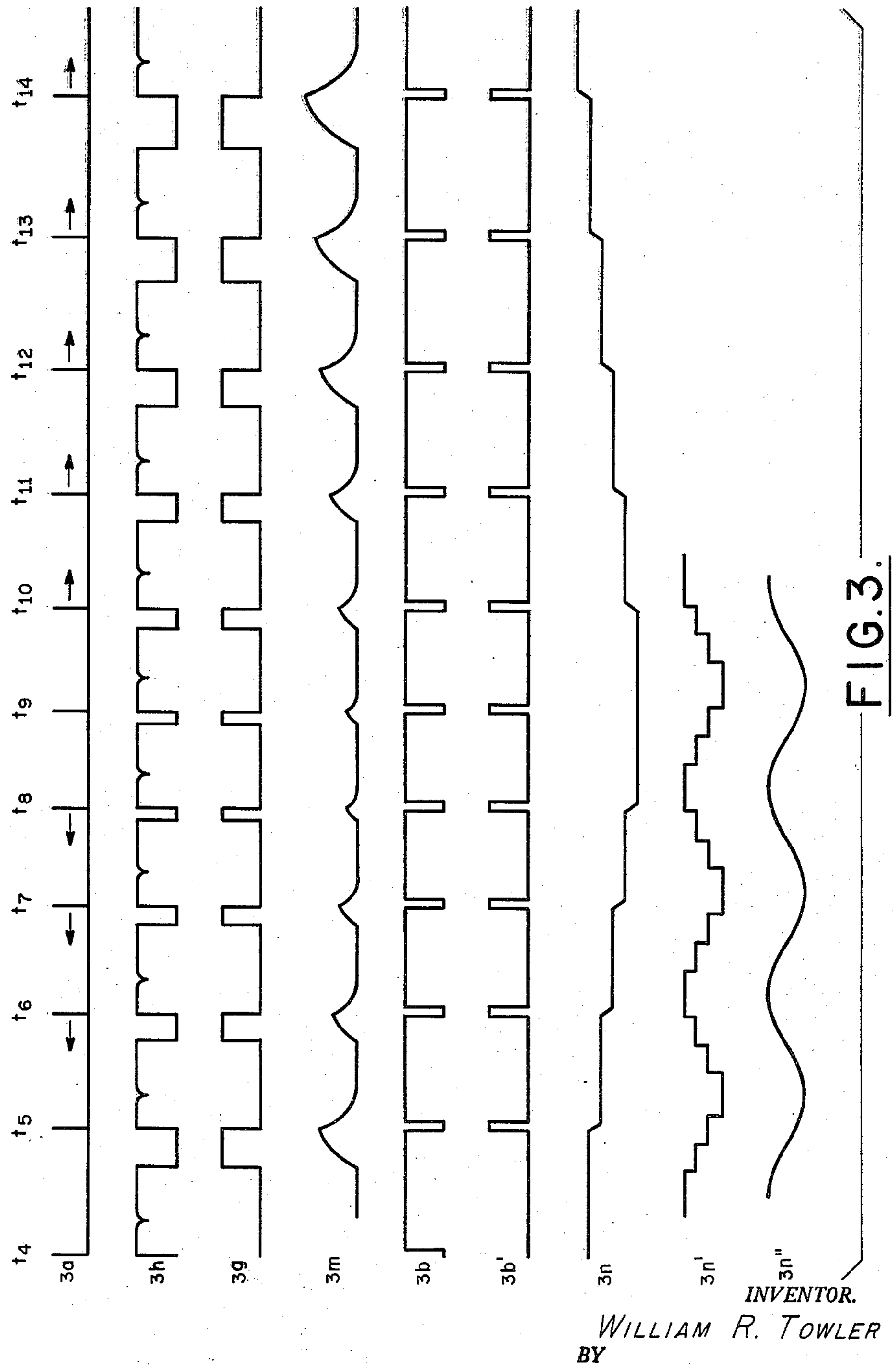

Certain waveforms of FIG. 2 have been reproduced in FIG. 3 to aid in describing the modulation and demodulation of the pulses circulating between two stations. These waveforms are considered to be a continuation of the waveforms in FIG. 2 after lock on occurs at time $t_4$. It should be kept in mind that the process of lock on as described with reference to FIG. 2 occurs over a longer time period that includes many more pulses than are shown. Actual lock on requires 100 to 200 pulses before the gates stabilize as shown at time $t_4$. With a nominal repetition rate of 8 kc., this requires only a fraction of a second.

For demodulating the time-modulated received pulses a second output of summing amplifier 49 is coupled to integrator 60, which may be a conventional capacitor-resistor time-constant circuit that responds to the input waveform 3*g* and produces output waveform 3*m* wherein the positive ramp-type excursions of said waveform have magnitudes which are a function of the durations of the corresponding positive pulses of waveform 3*g*. Integrated waveform 3*m* and the short pulses of waveforms 3*b* and 3*b'* are coupled respectively from integrator 60 and blocking oscillator 22 to staircase detector 35. Staircase detector 35 is a conventional bidirectional switch type of detector in which time modulated pulses cause the circuit to connect a charging capacitor to an input terminal, or terminals, at which a regularly recurring ramp voltage is simultaneously present. As the time of occurrence of the time-modulated pulses (sampling pulses) varies, the magnitude of the sampled ramp voltage coupled to the storage capacitor varies. The detector allows the charging capacitor to charge or discharge at each sampling to assume the potential of the ramp voltage at that particular instant. A detector of this type is illustrated in FIG. 14.41 of Waveforms, by Chance et al., McGraw-Hill Book Co., New York, N.Y., 1949. The pulses of waveforms 3*b* and 3*b'* serve as the sampling pulses which permit the staircase detector to sample the magnitudes of the voltage ramps of waveform 3*m* at the time of occurrence of the sampling pulses. Thus, staircase detector 35 will produce an output such as waveform 3*n*.

Waveform 3*n'* is an example of the type of output which will be obtained from staircase detector 35 after a time interval much longer than the time interval represented in the other waveforms of FIG. 3.

Output waveform 3*n* is coupled to filter 61 which smoothes out the steps in waveform 3*n'* to produce smoothed output waveform 3*n''*. Waveform 3*n''* is coupled through switch 19 to amplifier 65 when said switch is in position II, through switch 66 either to speaker 67 or to the receiver of a telephone-type handset 68.

After having explained the interrelated functioning of the component circuits, each of which by itself is known in the art, a discussion of the operation of the circuit as a selective radio communicator will be explained, it being assumed that identical transmit-receive units as illustrated in FIG. 1 are located at both the calling and responding stations.

Ordinarily, the sets are in a standby condition during which switches 16, 19 and 66 are in their I position, switch 21 is open and switch 46 is in position to connect integrator 45 to closing gate generator 42. The operator who initiates the call at the calling station will direct his directional antenna 11 in bearing to the azimuth angle of his intended responding station, if known. If unknown, he may scan his directional antenna or he may connect omnidirectional antenna 10 to duplexer 15. Assume, however, that the azimuth of the desired responding station is known and that directional antenna 11 is connected through coaxial switch 12 to duplexer 15. The calling operator then connects manual range set 44 through switch 46 to closing gate generator 42 and selects a bias voltage, which may be calibrated in terms of range, that will cause closing gate generator 42 to function in a manner to be described to cause his system to respond only to signals from a responding station at the selected range. Having thus selected the azimuth and range, the calling operator next closes switch 21 which connects 1 kc. oscillator 20 to input gate 17 which now is open to pass said pulses. Said pulses are coupled to blocking oscillator 22 which produces negative output pulses as illustrated in FIG. 2*b*. These pulses are coupled to delay gate generator 25. The voltage tapped off potentiometer 32 is selected to provide a bias to the suppressor grid of the pentode so that the relaxation oscillator produces a plate circuit waveform 2*d* wherein the positive pulses are approximately 50 microseconds long. The pulses of waveform 2*d* are coupled over lead 36 to differentiator 37, and in the manner described above, negative pulses of waveform 2*e* modulate R.F. transmitter 13 which produces R.F. pulses in response thereto. Said transmitter pulses, each occurring 50 microseconds after a corresponding pulse passes through input gate 17, are coupled through duplexer 15 to directional antenna 11 where they are directionally radiated to the selected responding station.

The biasing voltage selected at manual range set 44 and coupled through switch 46 to the suppressor grid of closing generator 42 conditions the calling system to respond only to signals which are received from a responding station at the particular range selected at manual range set 44. In order for the calling station to respond only to pulses from a selected responding station the calling station receiver must be disabled for a time that includes the 50 microsecond delay of delay gate generator 25, the time for a transmitted pulse to propagate to and from the responding station, plus the response time of the responding station in retransmitting this pulse. At the conclusion of this time period the receiver at the calling station is enabled for a short interval of time to permit it to respond to the retainsmitted pulse from he responding station. This feature is accomplished in the following manner. The leading edges of the positive pulses of waveform 2*d* from delay gate generator 25 are coupled through summing amplifier 49 and are coupled out on lead 51 as the leading edges of the positive pulses of waveform 2*h*. The positive pulses of waveform 2*h* are the summation of the positive pulses of waveforms 2*d* and 2*f* from delay gate generator 25 and closing gate generator 42. This waveform 2*h* is coupled to input gate 17 on lead 51 and the positive pulses render gate 17 inoperative for their duration. The termination of the positive pulses of waveform 2*h* are determined by the recovery time of closing gate generator 42, which in turn is governed by the bias voltage applied over lead 43 to its suppressor grid, in this instance supplied from manual range set 44. The recovery time of closing gate generator 42 as a function of bias voltage from manual range set 44, and thus as a function of the range setting of manual range set 44, is a known property of said generator, this being a fundamental consideration in the selection and design of this circuit. This bias voltage is chosen to cause the trailing edge of the positive pulses of waveform 2*f*, and thus waveform 2*h*, to occur a few microseconds before the expected time of arrival of the next incoming pulse, this incoming pulse being a previously transmitted pulse which after traveling to the selected responding station, is retransmitted to the calling station. The expected time of arrival of the next incoming pulse subsequent to its transmission from the calling station is readily determined from the knowledge of the propagation time of electromagnetic waves to and from the responding station, and from the knowledge of the response time of the responding station, this response time being the 50 microsecond delay produced by a delay gate generator 25 in said responding station. The leading edge of the next succeeding positive pulse of waveform 2*h* is produced in the same manner as just described in response to the next succeeding pulse passed by input gate 17. Thus input gate 17 is enabled only during the occurrence of the negative pulses of waveform 2*h*. When lock on has been established, this enabling period of input gate 17 will be approximately 10 microseconds long, this being the duration of the negative pulses of waveform 2*i* from fixed gate generator 53. Pulses received at the calling station before the start of this enabling period, indicating a response from a station at a shorter range than the selected range, or pulses received after the conclusion of the enabling period, indicating a response from a responding station at a greater range than the selected range, will not be passed by input gate 17.

Now consider the reception at the selected responding station of transmitted pulses from the calling station. The responding station will be in a standby condition in which switches 16, 19 and 66 are in position I, switch 21 is open and switch 46 connects integrator 45 to closing gate generator 42. Also, coaxial switch 12 connects omnidirectional antenna 10 to duplexer 15. In this condition, pulses from the sending station received by omnidirectional antenna 10 are coupled through coaxial switch 12 and duplexer 15 to receiver 14, through contact I of switch 16 to the 1 kc. filter 18. The audio output signal from filter 18 is coupled through contact I of switch 19, amplifier 65 and contact I of switch 66 to speaker 67 whose output is a 1 kc. audio tone which alerts the selected responding station operator that someone is calling him.

The responding station operator then switches coaxial switch 12 to connect his directional antenna 11 to duplexer 15, and searches in azimuth until he again receives the 1 kc. audio tone. He then picks up his handset 68 and speaks into its speaker to acknowledge the call. Handset 68 normally rests in a cradle, as is customary with telephone handsets, and in the apparatus of this invention a switch actuating means such as a relay (not illustrated) is associated with the cradle for controlling switches 16, 19 and 66. That is, when handset 68 is in its cradle, the switching means maintains switches 16, 19 and 66 in their I positions, and when handset 68 is raised from its cradle, switches 16, 19 and 66 move to their II positions. Therefore, when the receiving station operator hears the audio tone from speaker 67 and picks up his handset 68, switches 16, 19 and 66 automatically switch to their II positions. Input gate 17 of the responding station now is coupled to receive input pulses from its directional antenna 11, and handset 68 is coupled through switches 19 and 66 so that its receiver receives the filtered detector output, waveforms $3n''$, from filter 61.

After the selected responding station operator speaks into his handset 68, the calling station operator hears the response and opens his switch 21 to disconnect 1 kc. generator 20 from input gate 17, and also switches his switch 46 to connect his integrator 45 to his closing gate generator 42. The calling station set then automatically locks on to the pulses being received from the selected responding station and the selective closed-loop communication link is established. Both parties now are free to speak just as in conventional telephonic conversion, and no "press-to-talk" switching is required.

The selected responding station automatically locks on the desired pulses from the calling station, to the exclusion of pulses from all other stations at different locations, in the manner now to be described. The waveform of particular interest in this operation is waveform 2*h* (the inverse of waveform 2*g*) since the negative pulses of waveform 2*h* control the time during which input gate 17 is open and thus is enabled to receive the next received pulse of waveform 2*a*. It should be particularly noted that during the time interval $t_0$–$t_4$, FIG. 2, the beginning of the negative pulses of waveform 2*h* progressively occur later in time and thus closer to the next received pulse of waveform 2*a* until at time $t_4$ these pulses commence just immediately prior to the expected time of arrival of the next desired input pulse of waveform 2*a*, thus blocking input gate 17 so that it will not pass undesired pulses occuring earlier than the desired input pulses. When the desired input pulse is received, input gate 17 immediately closes, thus, eliminating the receipt of pulses from a greater distance than that desired. Waveform 2*d* from delay gate generator 25 and waveform 2*f* from closing gate generator 42 are produced in the manner already described and are combined in summing amplifier 49 to produce waveform 2*g* whose positive pulses have durations equal to the sum of the successive positive pulses of said waveforms 2*d* and 2*f*. Waveform 2*f* from closing gate generator 42 also is coupled to fixed gate generator 53 and causes said fixed gate to produce the short negative pulses of waveform 2*i* commencing at the trailing edge of each positive pulse of waveform 2*f*. The negative pulses of waveform 2*i* are, in effect, subtracted from the initial portion of the positive pulses of waveform 2*g* in adding circuit 55 to produce the difference waveform 2*j* whose positive pulses are progressively shortened as the pulses of waveform 2*i* occur progressively later. The decreasing duration of the positive pulses of waveform 2*j* cause the output of integrator 49 to go in a still more negative direction, thus further extending the duration of the positive pulses of waveform 2*f* from closing gate generator 49. This feedback operation continues until the positive pulses of waveform 2*g* are shortened in duration to substantially equal the fixed-time negative pulses of waveform 2*i*. When this occurs, see waveforms at time $t_4$, waveform 2*j* reaches a steady state value, and the feedback to closing gate generator 42, waveform 2*k*, reaches a steady state value. Thus, waveforms 2*f*, 2*h*, 2*g* and 2*i* will not change further. By comparing waveforms 2*h* and 2*a* at time $t_4$, it will be seen that the negative enabling pulses of waveform 2*h* now occur just immediately prior to the next received pulse of waveform 2*a*. The trailing edges of the negative pulses of waveform 2*h* are produced in response to the leading edge of the positive pulses of waveform 2*d*, i.e., the next succeeding input pulse of waveform 2*a*, and thus are fixed in position with respect to the next input pulse.

The operation just described has the effect to lock on the pulse repetition rate, and thus on range, of the calling station. A decrease in range between the calling and responding stations, i.e., pulses of waveform 2*a* are closer together, will have the effect to shorten the durations of the positive pulses of waveform 2*g* from summing amplifier 49 since the trailing edge of said positive pulses are produced in response to the beginning of the next successive received pulse, see waveforms 2*a*, 2*d* and 2*g*. This permits the negative pulses of waveforms 2*i* and 2*h* to occur sooner, thus allowing them to lock on the more closely spaced input pulses of waveform 2*a*. An increase in range, i.e., pulses of waveform 2*a* are farther apart, will have just the opposite effect to lengthen the duration of the positive pulses of waveforms 2*g*, and thus lengthen the recovery time of closing gate generator 42. This lengthens the time intervals between the respective negative pulses of each of the waveforms 2*i* and 2*h*, permitting the negative pulses of waveform 2*h* to lock on the input pulses of waveform 2*a*. In all instances, the change in duration of the positive pulses of waveform 2*f* from closing gate generator 42 is such as to minimize the positive pulses of waveform 2*j* (the difference signal from adding circuit 56), and thus cause a steady state condition, i.e., lock on, to occur.

The operation of the circuit to pulse-position modulate the transmitted pulses in accordance with the audio signal next will be explained. The microphone illustrated at 38 is in reality the transmitter of handset 68 illustrated at the right of FIG. 1. The audio signal from the transmitter of handset 68 (microphone 38) is coupled through resistor 31 to the suppressor grid of delay gate generator 25, thus causing the voltage bias on the suppressor grid to vary in accordance with the audio signal. The recovery time of the relaxation oscillator forming delay gate 25 depends, in part, upon the voltage bias on the suppressor grid, and therefore, the durations of the positive pulses of waveform 2*d* are varied in accordance with the audio signal. This is represented by the horizontal double-pointed arrows on the trailing edges of the positive pulses of waveform 2*d*. Because the transmitter 13 is triggered by the negative spikes of waveform 2*e* resulting from the differentiation of the trailing edges of the positive pulses of waveform 2*d*, the time delay between the passage of pulses through input gate 17 and the retransmission of those pulses varies around the 50 microsecond norm at the audio rate.

The pulse position modulated signals received at a station are demodulated in staircase detector 35 in the following manner. This portion of the discussion assumes that the two stations are locked on in range and are pulsing each other in closed-loop operation. Referring now to the waveforms of FIG. 3, the positive pulses of waveform 3*g* are integrated in integrator 60 to produce the positive going voltage ramps of waveform 3*m*. The positive going ramps of waveform 3*m* are coupled to staircase detector 35, a bidirectional switch type of detector, and the pulses of waveforms 3*b* and 3*b'* are time modulated (pulse-position modulated) in accordance with the audio signal of the other station and cause the detector 35 to operate to connect the ramp voltage waveforms to a storage capacitor at the instance of occurrence of said time-modulated pulses. This action is illustrated in FIG. 3 wherein the time of occurrence of the received pulses 3*a* are shown as occurring progressively earlier until time $t_8$. The amplitude at which the first voltage ramp of waveform 3*m* is sampled is determined by the time $t_5$ at which the input pulse of waveform 3*a* occurs after the input gate 17 has opened. The negative-going edge of waveform 3*h* is the time at which the input gate 17 opens. By referring to the waveforms of FIG. 3 at times $t_6$, $t_7$ and $t_8$, it may be seen how the decreasing time interval between pulses of waveform 3*a* also decreases the durations of the positive going pulses of waveform 3*g*, and in so doing, the magnitudes of the voltage ramps of waveform 3*m* are decreased as the positive pulses of waveform 3*g* are shortened. The magnitudes of the ramp-type waveforms then increase as the time intervals between input pulses progressively increases from time $t_{10}$ to $t_{14}$. The waveform taken off the storage capacitor of staircase detector 35, FIG. 3*n*, is filtered, or smoothed, in filter 61 to produce waveform 3*n*'' which is coupled to handset 68 through contact II of switch 19, amplifier 65 and switch 66 to produce an aural signal.

While the invention has been described in its preferred embodiments, it is to be understood that the words which have been used are words of description rather than limitation and changes within the purview of the appended claims may be made without departing from the true scope and spirit of the invention in its broader aspects.

What is claimed is:

1. Selective radio communication apparatus comprising means for radiating and receiving pulses of electromagnetic energy, normally responsive input gating means coupled to said receiving means for passing received pulses, first delaying means coupled to said input gate and responsive to pulses passed thereby for producing respective signals each having a duration representing a first delay period, means responsive to said signals of said first delaying means for transmitting pulses at the conclusion of each of said delay periods, means coupled to said first delaying means for introducing a modulating signal to said delaying means, said delaying means responding to said modulating signal to vary the duration of said first delay period in accordance with said modulating signal, whereby the time of occurrence of said transmitted pulses varies in accordance with said modulating signal, a second delaying means coupled to said first delaying means and operable at the conclusion of each of said first delay periods to produce a signal having a duration representing a second delay period, means for combining said first and second delayed signals to produce a resultant signal having a duration equal to the sum of said two successive delay periods, means coupled to said second delaying means and operable at the conclusion of said second delayed signal for producing a short fixed-time signal having a duration greater than the duration of a received pulse, means for combining said resultant signal and the successively following fixed-time signal to produce a difference signal having a duration which commences at the conclusion of said fixed-time signal and concludes at the time of occurrence of the next succeeding resultant signal, means for deriving a biasing voltage having a magnitude which is a function of the duration of said difference signal, said second delaying means being coupled to receive said biasing voltage and responding thereto to change the duration of said second delay period as a function of the duration of said difference signal, the change in duration of said second delay period being of a sense to minimize said difference signal, means for coupling said resultant signal to said input gate to disable said gate for the duration of said resultant signal, means responsive to said resultant signal for producing a ramp-type signal having a duration and a magnitude which are functions of the time interval between the occurrences of successive resultant signals, and detecting means coupled to receive said ramp-type signal and said received pulses to produce an output signal which is a function of the time of occurrence of a newly received pulse relative to a ramp-type signal simultaneously coupled to said detecting means.

2. The combination claimed in claim 1 including pulse generating means having a given pulse repetition frequency adapted to be connected to said input gate to initiate the transmission of pulses from said apparatus.

3. The combination claimed in claim 2 including a signal filtering means for selectively passing pulses having a pulse repetition frequency substantially the same as that of said pulse generating means, switching means for alternatively connecting said receiving means to said input gate or said filtering means, and means responsive to a signal passed by said filtering means for providing an indication when a signal at said pulse repetition frequency is received by said receiving means.

4. The combination claimed in claim 1 wherein said transmitting and said receiving means are connected through a duplexing means to a transmission line switch, and a directional antenna and an omnidirectional antenna each coupled to said transmission line switch, said switch being operable to selectively connect one of said antennas to said duplexing means.

5. The combination claimed in claim 1 including switching means for selectively connecting said biasing voltage to said second delaying means, and further including a source of variable voltage coupled to said switching means to be alternatively connected to said second delaying means, whereby the time of occurrence of said enabling signal and thus the time of occurrence of the enabled period of said input gate may be varied in accordance with said variable voltage, whereby said apparatus selectively may be conditioned to receive pulses from sending stations at different ranges.

6. The combination claimed in claim 1 wherein said means for radiating and receiving pulses of electromagnetic energy includes a directional antenna.

7. Selective radio communication apparatus comprising means for receiving pulses of electromagnetic energy, input gating means normally open to pass pulses received by said receiving means, delay and transmitting means coupled to said input gating means and responsive to pulses passed thereby for retransmitting each pulse passed by said input gate at a selected time delay after the receipt of each pulse, means coupled to said delay and transmitting means for introducing a modulating signal thereto, said delay and transmitting means responding to said modulating signal to vary said time delay and thus the time of retransmission of pulses as a function of said modulating signal, means for disabling said input gating means for the duration of said delay time, second delaying means for further disabling said input gate for an additional time slightly less than the time required for a retransmitted pulse to propagate to a selected responding station and back pulse a selected delay time introduced by said responding station, said last-named means including means for generating at the conclusion of said second delay period a short-duration fixed-time signal having a duration greater than the duration of a received pulse, means responsive to said two delaying means for producing a resultant signal, said resultant signal commencing at the conclusion of said second disabling period and concluding at the time of receipt of the next succeeding pulse passed by said input gate, means for combining said resultant signal and said fixed-time signal for deriving a signal representing the difference in duration between the two signals, means responsive to said difference signal for deriving a feedback signal to control said second delaying means to vary said additional delay time to minimize said difference signal, and demodulating means coupled to receive said resultant signal and the input pulses passed by said input gate for producing an output signal whose magnitude varies as a function of the time of occurrence of said input pulses relative to said resultant signals.

8. Selective radio communication apparatus comprising means for radiating and for receiving pulses for electromagnetic energy, input gating means for passing a received pulse, gate generating means responsive to the pulse passed by said input gate for producing a first gating pulse having a first time period, means responsive to said first gate generating means for transmitting a pulse at the conclusion of said first time period, means for disabling said input gate immediately after the receipt of said input pulse for the duration of said first time period, a second gate generating means for generating a second gating pulse commencing at the conclusion of said first time period and having a duration constituting a second time period, means responsive to said second gate generating means for maintaining said input gating means disabled for the duration of said second time period, means for generating a short fixed-time pulse at the conclusion of said second time period, said fixed-time pulse having a duration greater than that of said input pulses, means for deriving a difference signal which commences at the conclusion of said fixed-time pulse and concludes at the commencement of a next succeeding first gating pulse, means responsive to said difference signal for obtaining a biasing voltage whose magnitude is a function of the duration of said difference signal, said second gating means being coupled to receive said biasing voltage and responding thereto to change the duration of said second time period to minimize said difference signal, and means for coupling a modulating signal to said first gating means, said first gating means responding to said modulating signal to vary the duration of said fixed time period in accordance with said modulating signal, whereby the occurrence of said transmitted pulses varies in time in accordance with said modulating signal.

9. In a pulse communication system, means for establishing exclusive contact between a calling station and a selected responding station remotely located from said calling station wherein said calling and responding stations each include pulse transmission and normally responsive pulse receiving means comprising first and second means operating in cooperation with the respective transmitting and receiving means of each station for retransmitting each received pulse at a given time delay after the receipt of the pulse, gating means respectively operating in cooperation with said calling and responding station receivers for disabling the respective receivers immediately after the passage of a pulse through its respective input gate for a time interval substantiallly equal to twice said given delay time plus an interval slightly less than the round-trip propagation time of a pulse between said two stations, whereby the receivers at said two stations respectively are enabled for short time intervals sufficient to pass pulses from the other one of said stations but are disabled to block pulses from stations at distances different from the distance separating said two stations, means at each station for producing a modulating electrical signal in response to a respective intelligence signal, means for varying said time delay at each station in accordance with said modulating signal at that station, whereby pulses transmitted from each station are time modulated in accordance with its respective intelligence signal, and pulse position demodulating means at each station for producing an intelligence signal in response to the time modulated pulses received at the respective station.

References Cited in the file of this patent

UNITED STATES PATENTS

| | | |
|---|---|---|
| 2,516,356 | Tull et al. | July 25, 1950 |
| 2,612,601 | Musselman | Sept. 30, 1952 |
| 2,790,166 | Buehrle et al. | Apr. 23, 1957 |